(12) United States Patent
Liu et al.

(10) Patent No.: US 10,234,275 B1
(45) Date of Patent: Mar. 19, 2019

(54) DEVICE FOR MONITORING THICKNESS OF WHEEL VALVE HOLE ON LINE

(71) Applicant: CITIC Dicastal CO., LTD., Qinhuangdao, Hebei (CN)

(72) Inventors: Weidong Liu, Qinhuangdao (CN); Fengyan Liu, Qinhuangdao (CN); Jinling Yang, Qinhuangdao (CN)

(73) Assignee: CITIC Dicastal CO., LTD., Qinhuangdao Hebei (CN)

( * ) Notice: Subject to any disclaimer, the term of this patent is extended or adjusted under 35 U.S.C. 154(b) by 0 days.

(21) Appl. No.: 16/116,119

(22) Filed: Aug. 29, 2018

(30) Foreign Application Priority Data

Aug. 31, 2017 (CN) .......................... 2017 1 0774479

(51) Int. Cl.
| | | |
|---|---|---|
| *G01B 11/00* | (2006.01) | |
| *G01B 5/06* | (2006.01) | |
| *G01B 3/50* | (2006.01) | |
| *G01B 11/06* | (2006.01) | |
| *B23Q 17/20* | (2006.01) | |
| *G01B 21/08* | (2006.01) | |
| *G01B 5/12* | (2006.01) | |
| *B23Q 17/24* | (2006.01) | |

(52) U.S. Cl.
CPC .......... *G01B 11/0691* (2013.01); *B23Q 17/20* (2013.01); *B23Q 17/2471* (2013.01); *G01B 5/12* (2013.01); *G01B 21/08* (2013.01)

(58) Field of Classification Search
CPC .... G01B 11/0691; G01B 21/08; G01B 5/143; G01B 5/06; G01N 5/12; B23Q 17/2471; B23Q 17/20
See application file for complete search history.

(56) References Cited

U.S. PATENT DOCUMENTS

| | | | | |
|---|---|---|---|---|
| 4,129,950 A | * | 12/1978 | Weinhaus | ................ G01B 3/30 33/203.19 |
| 6,904,795 B1 | * | 6/2005 | Uleski | ................ B60C 23/0408 73/146 |
| 7,877,890 B2 | * | 2/2011 | Weber | .................... A61B 90/36 33/613 |
| 7,926,189 B1 | * | 4/2011 | Pellegrino | .............. G01B 5/255 33/203.18 |

(Continued)

FOREIGN PATENT DOCUMENTS

| CN | 201311276 Y | 9/2009 |
|---|---|---|
| CN | 103557811 A | 2/2014 |

(Continued)

*Primary Examiner* — Sang H Nguyen
(74) *Attorney, Agent, or Firm* — Cooper Legal Group, LLC (57) ABSTRACT

The disclosure discloses a device for monitoring the thickness of a wheel valve hole on line, which is mainly composed of a frame, a base plate, a lifting cylinder, a first bracket, a bearing base, a linear bearing, a mounting plate, a guide shaft, a lifting shaft, a first servo motor, a first synchronous pulley, a connecting plate, a synchronous belt, a second synchronous pulley and the like, wherein the base plate, a third bracket and a second mounting rack are fixed on the frame, a visual sensor is mounted on the third bracket, the mounting plate is fixed on the base plate via the first bracket, the bearing base is fixed on the mounting plate, and the lifting shaft is mounted on the bearing base via the linear bearing.

2 Claims, 10 Drawing Sheets

(56) References Cited

U.S. PATENT DOCUMENTS

| | | | | |
|---|---|---|---|---|
| 2002/0189114 A1* | 12/2002 | Voeller | ................ | G01B 5/255 |
| | | | | 33/203.18 |
| 2010/0133067 A1* | 6/2010 | Martinelli | ............ | B65G 47/847 |
| | | | | 198/470.1 |
| 2017/0211921 A1* | 7/2017 | Zheng | ..................... | G01B 5/06 |
| 2018/0356199 A1* | 12/2018 | Yang | ....................... | G01B 3/50 |

FOREIGN PATENT DOCUMENTS

| | | |
|---|---|---|
| CN | 203908508 U | 10/2014 |
| CN | 204924223 U | 12/2015 |
| CN | 105371730 A | 3/2016 |
| CN | 105928476 A | 9/2016 |
| CN | 205950211 U | 2/2017 |
| CN | 206410683 U | 8/2017 |

\* cited by examiner

DEVICE FOR MONITORING THICKNESS OF WHEEL VALVE HOLE ON LINE

CROSS-REFERENCE TO RELATED APPLICATION

The present application claims benefit of Chinese Patent Application No. 201710774479.8, filed on Aug. 31, 2017, the contents of which are hereby incorporated by reference in its entirety.

BACKGROUND

In the machining of an automobile wheel, the thickness of a valve hole is an important dimension that affects the assembly of the wheel. Therefore, the thickness of the valve hole must be monitored, and is also an important factor affecting the safety of the automobile. Wheel manufacturers usually use thickness detection plates to monitor the thicknesses of valve holes. Such detection method has the problem of human detection misjudgment and increases the labor cost.

SUMMARY

The present disclosure relates to a machining device, specifically to a dimension detection device in a wheel machining process.

The object of the present disclosure is to provide a device for monitoring the thickness of a wheel valve hole on line.

In order to achieve the above object, the technical solution of the present disclosure is The present disclosure relates to a device for monitoring the thickness of a wheel valve hole on line, which i mainly composed of a frame, a base plate, a lifting cylinder, a first bracket, a bearing base, a linear bearing, a mounting plate, a guide shaft, a lifting shaft, a first servo motor, a first synchronous pulley, a connecting plate, a synchronous belt, a second synchronous pulley, a base, a first connecting shaft, a second servo motor, a first shaft sleeve, a lower end cover, a second connecting shaft, a second shaft sleeve, a cylinder, a first bearing, an end cover, a gland, second bearings, a base plate, a flange plate, pins, springs, expansion flaps, a third connecting shaft, a guard, an expansion core, a third servo motor, a first lead screw, a first linear guide rail, a sliding rack, a second linear guide rail, a second lead screw, a fourth servo motor, a second bracket, a first infrared thru-beam sensor, a first mounting rack, a turnover block, a fifth servo motor, a third lead screw, a turnover seat, a second infrared thru-beam sensor, a second mounting rack, a third bracket and a visual sensor. The base plate, the third bracket and the second mounting rack are fixed on the frame, the visual sensor is mounted on the third bracket, the mounting plate is fixed on the base plate via the first bracket, the bearing base is fixed on the mounting plate, the lifting shaft is mounted on the bearing base via the linear bearing, the two ends of the lifting shaft are respectively connected with the connecting plate and an output shaft of the lifting cylinder, the first servo motor and the base are fixed on the connecting plate, the first shaft sleeve is mounted on the base via the first bearing and the end cover, the first synchronous pulley and the second synchronous pulley are respectively connected with the first connecting shaft and an output shaft of the first servo motor, and the synchronous belt is connected with the first synchronous pulley and the second synchronous pulley respectively.

The lower end cover, the gland and the base plate are fixed on the first shaft sleeve, the second servo motor is mounted on the lower end cover, the second shaft sleeve is mounted on the first shaft sleeve via two columns of second bearings and the gland, the cylinder is fixed inside the second shaft sleeve, an output end of the cylinder is connected with the second connecting shaft, the second servo motor is connected with the second shaft sleeve via the second connecting shaft, the expansion core is connected with the second shaft sleeve via the third connecting shaft, the expansion core, the third connecting shaft and the second shaft sleeve are circumferentially locked without relative rotation, the third connecting shaft and the second shaft sleeve can move axially relatively, the flange plate is fixed on the base plate, eight uniform T-shaped chutes are formed in the inner cavity of the flange plate and the base plate, the bottom surfaces of the eight expansion flaps respectively form T-shaped structures with the eight T-shaped chutes in one-to-one correspondence, the expansion flaps can smoothly and accurately slide in the chutes, the inner side walls of the expansion flaps are 15° inclined surfaces, and the ends of the eight springs are respectively connected with the flange plate and the eight expansion flaps; the lateral surface of the expansion core comprises two groups of inclined surfaces uniformly spaced 15°, the number of each group of inclined surfaces is 8, the two inclined surfaces have a height difference, and the upper side walls of the two groups of inclined surfaces are intersected at tapered surfaces; when the expansion core is at the bottom under the co-action of the pulling force of the cylinder and the elastic force of the springs, the side walls of the expansion flaps are in contact with the tapered surfaces of the expansion core; the second servo motor drives the expansion core to rotate 22.5° via the second connecting shaft, the second shaft sleeve and the third connecting shaft, and the expansion flaps matched with the inclined surfaces can be switched between the inclined surfaces of the expansion core. The cylinder drives the third connecting shaft and the expansion core to move up and down, the eight expansion flaps move synchronously centripetally and centrifugally in the eight uniform T-shaped chutes formed in the inner cavity of the flange plate and the base plate via the fit of the expansion flaps and the inclined surfaces of the expansion core, and the eight expansion flaps realize high-precision synchronous expansion and contraction functions; since the two groups of inclined surfaces spaced uniformly on the lateral surfaces of the expansion core have a height difference, when the second servo motor drives the expansion core to rotate 22.5°, the expansion flaps matched with the inclined surfaces are switched between the inclined surfaces of the expansion core, thus, the expansion and contraction diameters of the expansion flaps change in two different ranges, and eventually the expansion flaps achieve large-stroke expansion and contraction.

The third servo motor and the first linear guide rail are fixed on the second mounting rack, the first lead screw is connected with the sliding rack and the third servo motor, and the third servo motor can drive the sliding rack to move up and down along the first linear guide rail via the first lead screw; the second linear guide rail and the fourth servo motor are fixed on the sliding rack, the second lead screw is connected with the second bracket and the fourth servo motor, and the fourth servo motor can drive the second bracket to move left and right along the second linear guide rail via the second lead screw;

The fifth servo motor and the turnover seat are fixed on the second bracket, the fifth servo motor is connected with the third lead screw, the first mounting rack is fixed on the turnover block, the first infrared thru-beam sensor and the second infrared thru-beam sensor are fixed on the first mounting rack, the fifth servo motor is connected with the third lead screw, an empty slot is formed in the middle of the bottom surface of the turnover seat, the third lead screw passes through the empty slot—, symmetrical T-shaped ring slots are formed in the two inner sides of the turnover seat, two symmetrical T-shaped ring columns are arranged on the lower end face of the turnover block, and the T-shaped ring columns can be inserted into the T-shaped ring slots—; and ring teeth are arranged in the middle of the lower end face of the turnover block and engaged with the third lead screw. The fifth servo motor drives the third lead screw to rotate. Through the cooperation of the ring teeth and the third lead screw, the turnover block drives the first infrared thru-beam sensor and the second infrared thru-beam sensor to turn over along the center of the T-shaped ring slots in the turnover seat.

Corresponding pin holes are formed in the base plate and the flange plate, and the locating pins are respectively connected with the pin holes of the base plate and the flange plate to ensure the assembly precision of the base plate and the flange plate.

In actual use, a wheel is transported to the working position of the device via a roller bed, compressed air is introduced, the lifting cylinder drives the clamping mechanism to rise, the flange surface of the wheel is in contact with the flange plate, and then the lifting cylinder drives the wheel to rise to a designated position. A cylinder rod of the cylinder is in a contracted state, and under the action of the springs, the inclined surfaces of the expansion flaps are in contact with the upper tapered surfaces of the expansion core. According to the diameter of the center hole of the wheel, the first servo motor drives the expansion core to rotate a specific angle, so that the inclined surfaces of the expansion flaps are matched with the corresponding inclined surfaces of the expansion core; then the cylinder starts to work, and the cylinder overcomes the elastic force of the springs and drives the third connecting shaft and the expansion core to move up; and the expansion flaps move synchronously outward in the eight uniform T-shaped chutes formed in the inner cavity of the flange plate and the base plate through the cooperation of the inclined surfaces of the expansion flaps and the inclined surfaces of the expansion core, finally, the expansion flaps contact the center hole of the wheel, and the positioning and expansion process of the wheel is completed. The visual sensor detects the position of the wheel valve hole, and the first servo motor operates to align the wheel valve hole with the first infrared thru-beam sensor and the second infrared thru-beam sensor. Through the cooperation of the third lead screw and the turnover block, the fifth servo motor drives the first mounting rack, the first infrared thru-beam sensor and the second infrared thru-beam sensor to rotate, and finally, the first infrared thru-beam sensor and the second infrared thru-beam sensor are axially parallel to the valve hole. Then, the third servo motor and the fourth servo motor control the first infrared thru-beam sensor and the second infrared thru-beam sensor to radiate the valve hole, the sensors transmit the obtained signals to a signal processor, and the signal processor finally calculates the precise thickness of the valve hole. So far, the thickness detection of the valve hole is completed.

The device can meet the requirement for monitoring the thickness of a wheel valve hole on line, has the characteristics of simple structure, convenient manufacture, stable performance and precision that can meet the machining requirement, and can suit the requirements of automatic production.

BRIEF DESCRIPTION OF DRAWINGS

The embodiments of the present disclosure will be described in detail below in combination with the accompanying drawings, in which.

LIST OF REFERENCE SYMBOLS

1—frame, 2—base plate, 3—lifting cylinder, 4—first bracket, 5—bearing base, 6—linear bearing, 7—mounting plate, 8—guide shaft, 9—lifting shaft, 10—first servo motor, 11—first synchronous pulley, 12—connecting plate, 13—synchronous belt, 14—second synchronous pulley, 15—base, 16—first connecting shaft, 17—second servo motor, 18—first shaft sleeve, 19—lower end cover, 20—second connecting shaft, 21—second shaft sleeve, 22—cylinder, 23—first bearing, 24—end cover, 25—gland, 26—second bearing, 27—base plate, 28—flange plate, 29—pin, 30—spring, 31—expansion flap, 32—third connecting shaft, 33—guard, 34—expansion core, 35—third servo motor, 36—first lead screw, 37—first linear guide rail, 38—sliding rack, 39—second linear guide rail, 40—second lead screw, 41—fourth servo motor, 42—second bracket, 43—first infrared thru-beam sensor, 44—first mounting rack, 45—turnover block, 46—fifth servo motor, 47—third lead screw, 48—turnover seat, 49—second infrared thru-beam sensor, 50—second mounting rack, 51—third bracket, 52—visual sensor.

DETAILED DESCRIPTION

The details and working conditions of the specific device according to the present disclosure will be described in detail below in combination with the accompanying drawings.

Figure 1:
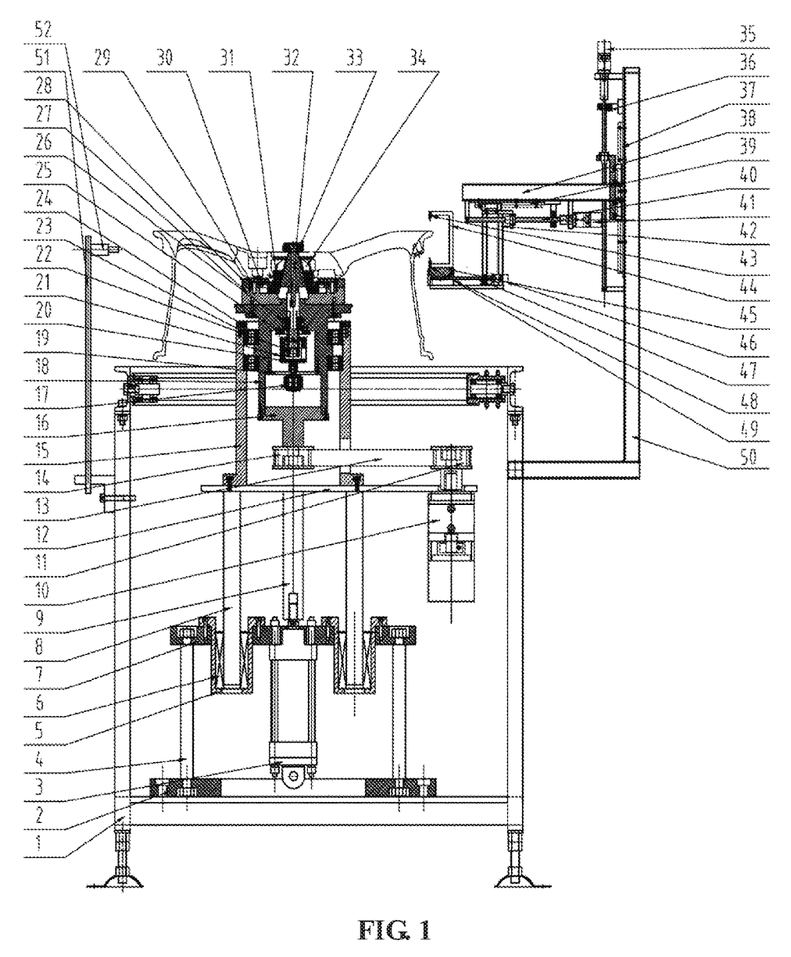
FIG. 1 is a structure diagram of a device for monitoring the thickness of a wheel valve hole on line according to the present disclosure.

The present disclosure relates to a device for monitoring the thickness of a wheel valve hole on line, which i mainly composed of a frame 1, a base plate 2, a lifting cylinder 3, a first bracket 4, a bearing base 5, a linear bearing 6, a mounting plate 7, a guide shaft 8, a lifting shaft 9, a first servo motor 10, a first synchronous pulley 11, a connecting plate 12, a synchronous belt 13, a second synchronous pulley 14, a base 15, a first connecting shaft 16, a second servo motor 17, a first shaft sleeve 18, a lower end cover 19, a second connecting shaft 20, a second shaft sleeve 21, a cylinder 22, a first bearing 23, an end cover 24, a gland 25, second bearings 26, a base plate 27, a flange plate 28, pins 29, springs 30, expansion flaps 31, a third connecting shaft 32, a guard 33, an expansion core 34, a third servo motor 35, a first lead screw 36, a first linear guide rail 37, a sliding rack 38, a second linear guide rail 39, a second lead screw 40, a fourth servo motor 41, a second bracket 42, an first infrared thru-beam sensor 43, a first mounting rack 44, a turnover block 45, a fifth servo motor 46, a third lead screw 47, a turnover seat 48, an second infrared thru-beam sensor 49, a second mounting rack 50, a third bracket 51 and a visual sensor 52. The base plate 2, the third bracket 51 and the second mounting rack 50 are fixed on the frame 1, the visual sensor 52 is mounted on the third bracket 51, the mounting plate 7 is fixed on the base plate 2 via the first bracket 4, the bearing base 5 is fixed on the mounting plate 7, the lifting shaft 9 is mounted on the bearing base 5 via the linear bearing 6, the two ends of the lifting shaft 9 are respectively connected with the connecting plate 12 and an output shaft of the lifting cylinder 3, the first servo motor 10 and the base 15 are fixed on the connecting plate 12, the first shaft sleeve 18 is mounted on the base 15 via the first bearing 23 and the end cover 24, the first synchronous pulley 11 and the second synchronous pulley 14 are respectively connected with the first connecting shaft 16 and an output shaft of the first servo motor 10, and the synchronous belt 13 is connected with the first synchronous pulley 11 and the second synchronous pulley 14 respectively.

Figure 2A:
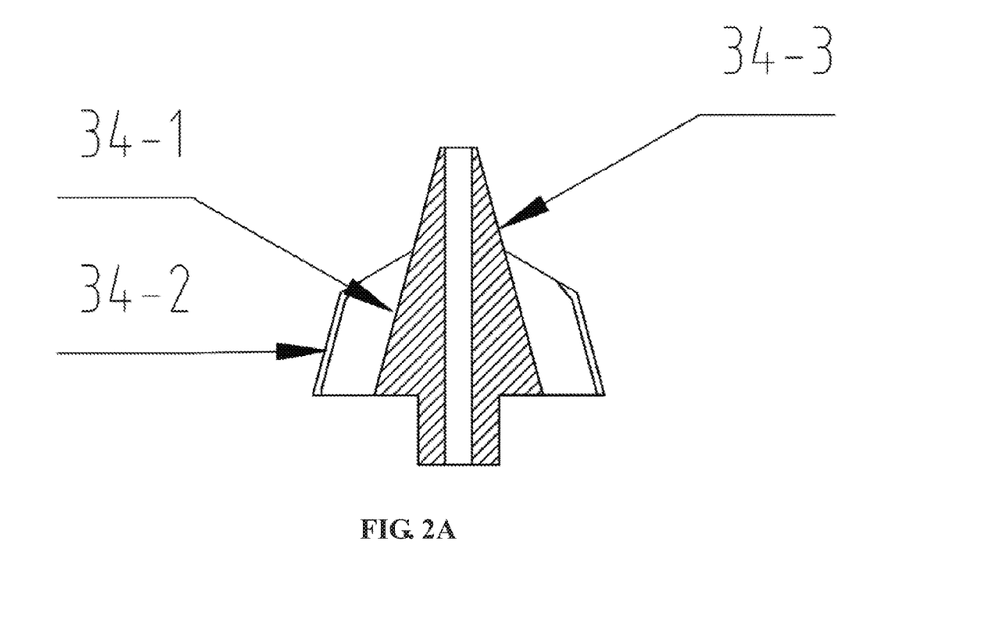
FIGS. 2A-2B are structure diagrams of an expansion core in the device for monitoring the thickness of a wheel valve hole on line according to the present disclosure.
Figure 2B:
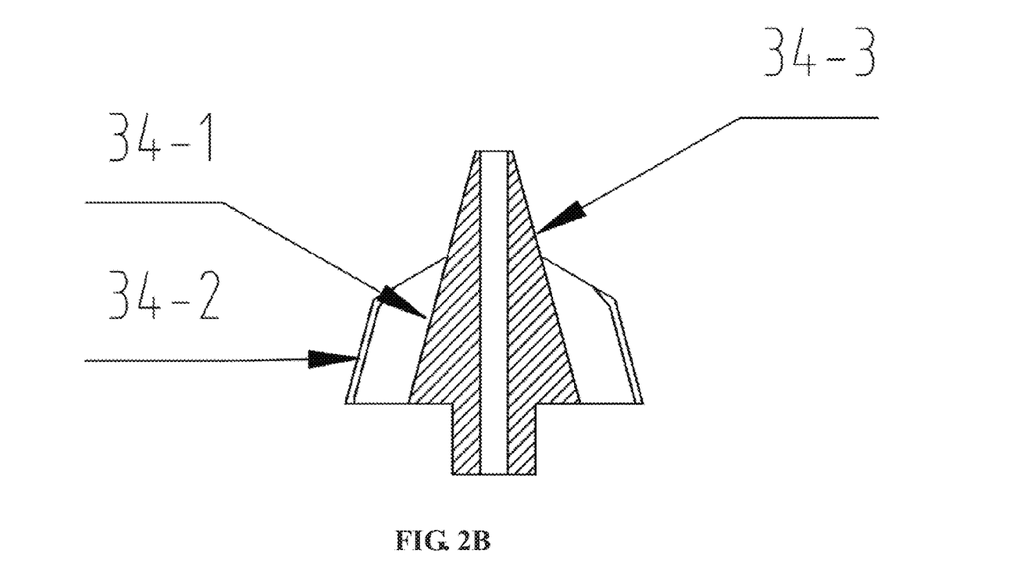
Figure 3A:
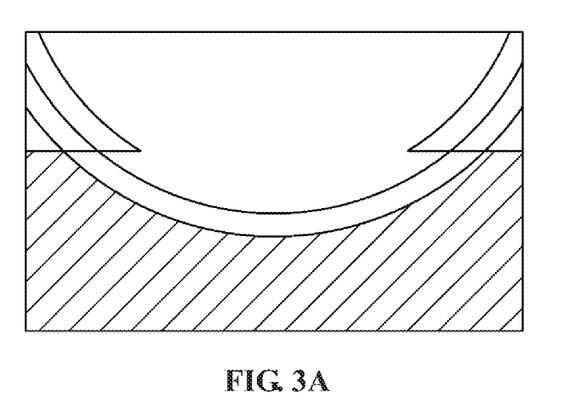
FIGS. 3A-3B are structure diagrams of a turnover seat in the device for monitoring the thickness of a wheel valve hole on line according to the present disclosure.
Figure 3B:
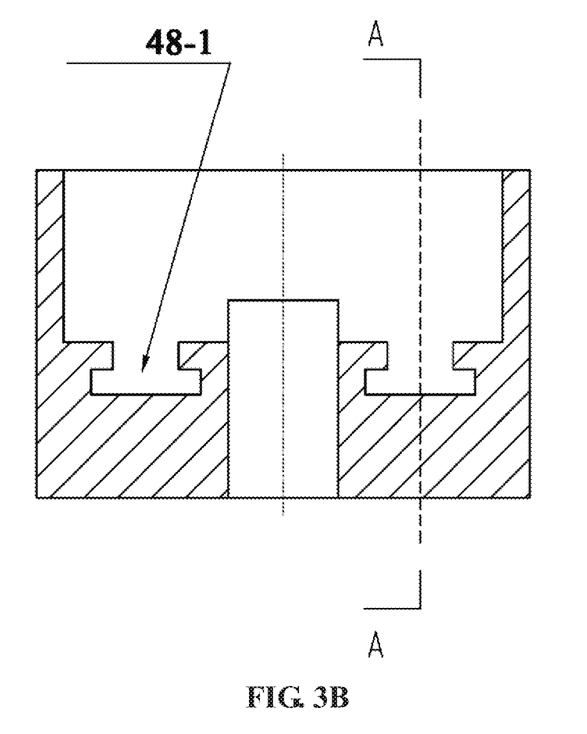
Figure 4A:
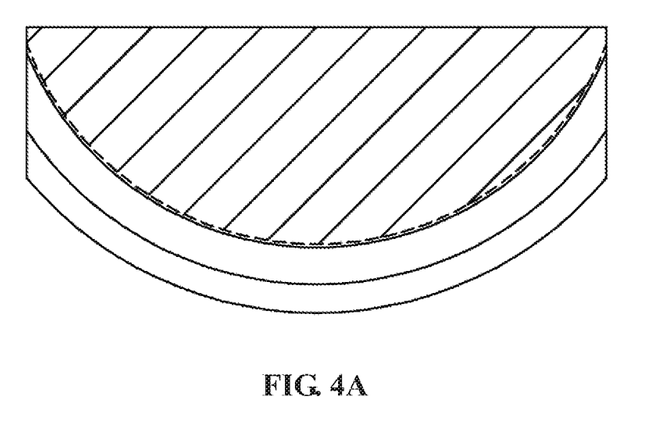
FIGS. 4A-4B are structure diagrams of a turnover block in the device for monitoring the thickness of a wheel valve hole on line according to the present disclosure.
Figure 4B:
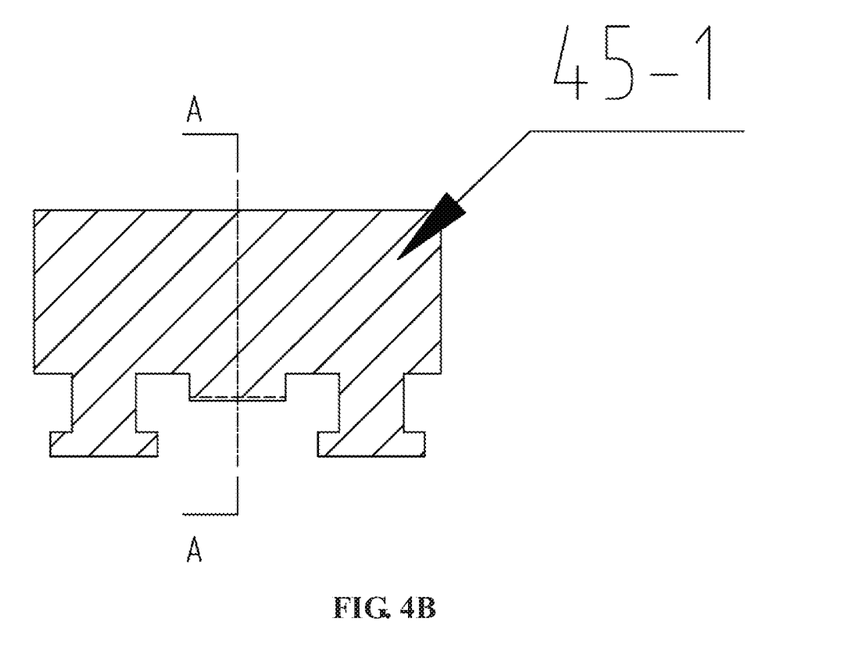
Figure 5A:
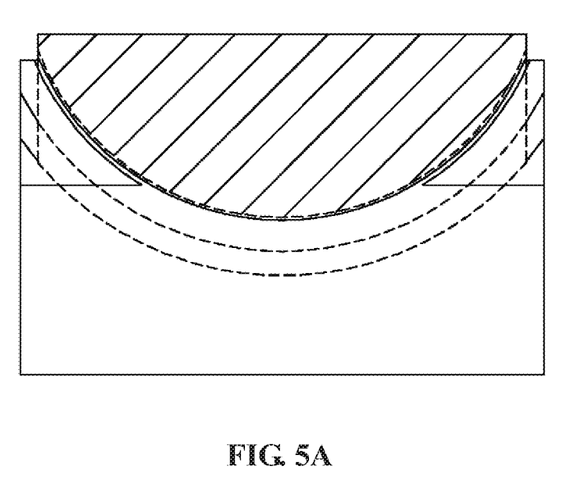
FIGS. 5A-5B are structure diagrams of a turnover mechanism in the device for monitoring the thickness of a wheel valve hole on line according to the present disclosure.
Figure 5B:
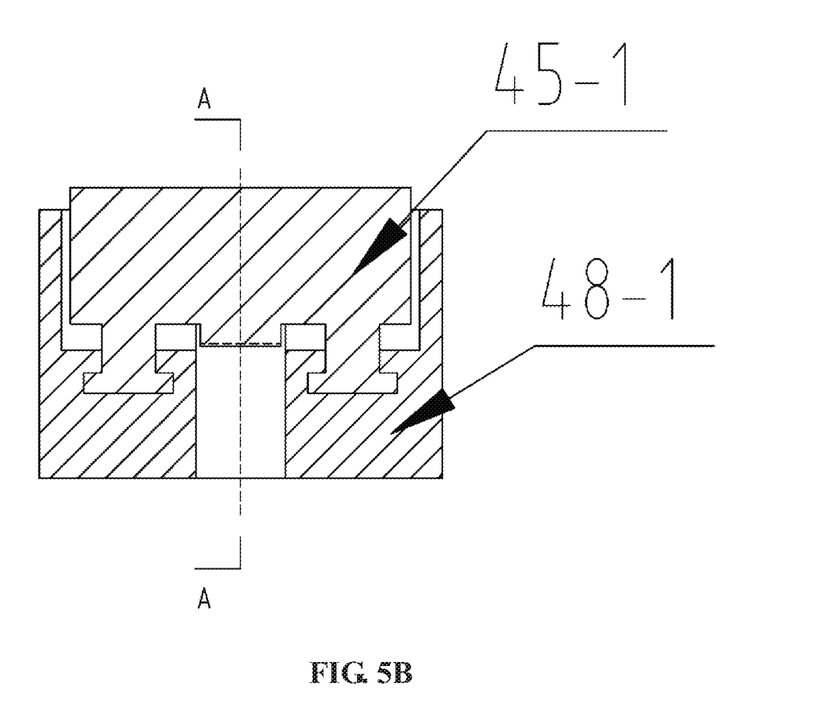

The lower end cover 19, the gland 25 and the base plate 27 are fixed on the first shaft sleeve 18, the second servo motor 17 is mounted on the lower end cover 19, the second shaft sleeve 21 is mounted on the first shaft sleeve 18 via two columns of second bearings 26 and the gland 25, the cylinder 22 is fixed inside the second shaft sleeve 21, an output end of the cylinder 22 is connected with the second connecting shaft 32, the second servo motor 17 is connected with the second shaft sleeve 21 via the second connecting shaft 20, the expansion core 34 is connected with the second shaft sleeve 21 via the third connecting shaft 32, the expansion core 34, the third connecting shaft 32 and the second shaft sleeve 21 are circumferentially locked without relative rotation, the third connecting shaft 32 and the second shaft sleeve 21 can move axially relatively, the flange plate 28 is fixed on the base plate 27, eight uniform T-shaped chutes are formed in the inner cavity of the flange plate 28 and the base plate 27, the bottom surfaces of the eight expansion flaps 31 respectively form T-shaped structures with the eight T-shaped chutes in one-to-one correspondence, the expansion flaps 31 can smoothly and accurately slide in the chutes, the inner side walls of the expansion flaps 31 are 15° inclined surfaces, and the ends of the eight springs 30 are respectively connected with the flange plate 28 and the eight expansion flaps 31; the lateral surface of the expansion core 34 comprises two groups of inclined surfaces 34-1 and 34-2 uniformly spaced 15°, the number of each group of inclined surfaces is 8, the two inclined surfaces have a height difference, and the upper side walls of the two groups of inclined surfaces are intersected at tapered surfaces 34-3; when the expansion core 34 is at the bottom under the co-action of the pulling force of the cylinder 22 and the elastic force of the springs 30, the side walls of the expansion flaps 31 are in contact with the tapered surfaces 34-3 of the expansion core 34; the second servo motor 17 drives the expansion core 34 to rotate 22.5° via the second connecting shaft 20, the second shaft sleeve 21 and the third connecting shaft 32, and the expansion flaps 31 matched with the inclined surfaces can be switched between the inclined surfaces 34-1 and 34-2 of the expansion core 34. The cylinder 22 drives the third connecting shaft 32 and the expansion core 34 to move up and down, the eight expansion flaps 31 move synchronously centripetally and centrifugally in the eight uniform T-shaped chutes formed in the inner cavity of the flange plate 28 and the base plate 27 via the fit of the expansion flaps 31 and the inclined surfaces of the expansion core 34, and the eight expansion flaps 31 realize high-precision synchronous expansion and contraction functions; since the two groups of inclined surfaces spaced uniformly on the lateral surfaces of the expansion core 34 have a height difference, when the second servo motor 17 drives the expansion core 34 to rotate 22.5°, the expansion flaps 31 matched with the inclined surfaces are switched between the inclined surfaces 34-1 and 34-2 of the expansion core 34, thus, the expansion and contraction diameters of the expansion flaps 31 change in two different ranges, and eventually the expansion flaps 31 achieve large-stroke expansion and contraction.

The third servo motor 35 and the first linear guide rail 37 are fixed on the second mounting rack 50, the first lead screw 36 is connected with the sliding rack 38 and the third servo motor 35, and the third servo motor 35 can drive the sliding rack 38 to move up and down along the first linear guide rail 37 via the first lead screw 36; the second linear guide rail 39 and the fourth servo motor 41 are fixed on the sliding rack 38, the second lead screw 40 is connected with the second bracket 42 and the fourth servo motor 41, and the fourth servo motor 41 can drive the second bracket 42 to move left and right along the second linear guide rail 39 via the second lead screw 40;

The fifth servo motor 46 and the turnover seat 48 are fixed on the second bracket 42, the fifth servo motor 46 is connected with the third lead screw 47, the first mounting rack 44 is fixed on the turnover block 45, the first infrared thru-beam sensor 43 and the second infrared thru-beam sensor 49 are fixed on the first mounting rack 44, the fifth servo motor 46 is connected with the third lead screw 47, an empty slot 48-2 is formed in the middle of the bottom surface of the turnover seat 48, the third lead screw 47 passes through the empty slot 48-2, symmetrical T-shaped ring slots 48-1 are formed in the two inner sides of the turnover seat 48, two symmetrical T-shaped ring columns 45-1 are arranged on the lower end face of the turnover block 45, and the T-shaped ring columns 45-1 can be inserted into the T-shaped ring slots 48-1; and ring teeth 45-2 are arranged in the middle of the lower end face of the turnover block 45 and engaged with the third lead screw 47. The fifth servo motor 46 drives the third lead screw 47 to rotate. Through the cooperation of the ring teeth 45-2 and the third lead screw 47, the turnover block 45 drives the first infrared thru-beam sensor 43 and the second infrared thru-beam sensor 49 to turn over along the center of the T-shaped ring slots 48-1 in the turnover seat 48.

Corresponding pin holes are formed in the base plate 27 and the flange plate 28, and the locating pins 29 are respectively connected with the pin holes of the base plate 27 and the flange plate 28 to ensure the assembly precision of the base plate 27 and the flange plate 28.

Figure 6:
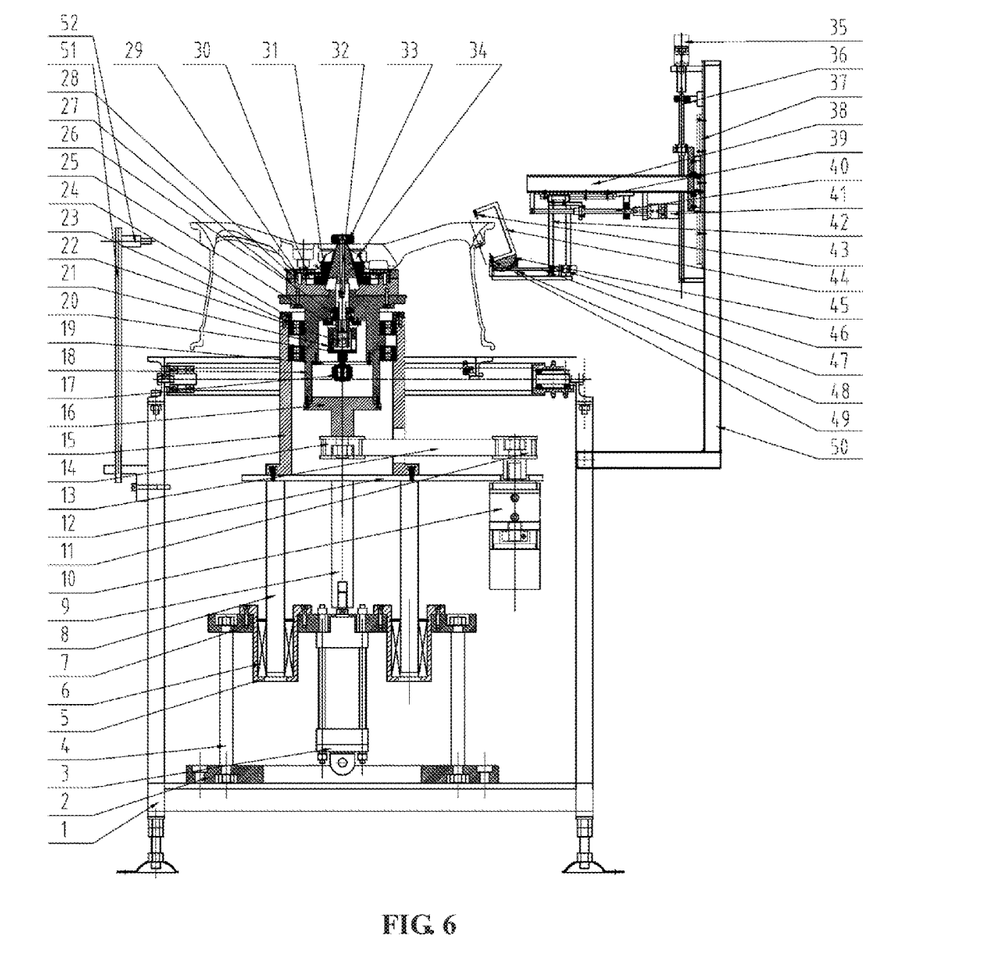
FIG. 6 is a structure diagram when the device for monitoring the thickness of a wheel valve hole on line according to the present disclosure works.

In actual use, a wheel is transported to the working position of the device via a roller bed, compressed air is introduced, the lifting cylinder 3 drives the clamping mechanism to rise, the flange surface of the wheel is in contact with the flange plate 28, and then the lifting cylinder 3 drives the wheel to rise to a designated position. A cylinder rod of the cylinder 22 is in a contracted state, and under the action of the springs 30, the inclined surfaces of the expansion flaps 31 are in contact with the upper tapered surfaces of the expansion core 34. According to the diameter of the center hole of the wheel, the first servo motor 10 drives the expansion core 34 to rotate a specific angle, so that the inclined surfaces of the expansion flaps 31 are matched with the corresponding inclined surfaces of the expansion core 34; then the cylinder 22 starts to work, and the cylinder 22 overcomes the elastic force of the springs 30 and drives the third connecting shaft 32 and the expansion core 34 to move up; and the expansion flaps 31 move synchronously outward in the eight uniform T-shaped chutes formed in the inner cavity of the flange plate 28 and the base plate 27 through the cooperation of the inclined surfaces of the expansion flaps 31 and the inclined surfaces of the expansion core 33, finally, the expansion flaps 31 contact the center hole of the wheel, and the positioning and expansion process of the wheel is completed. The visual sensor 52 detects the position of the wheel valve hole, and the first servo motor 10 operates to align the wheel valve hole with the first infrared thru-beam sensor 43 and the second infrared thru-beam sensor 49. Through the cooperation of the third lead screw 47 and the turnover block 45, the fifth servo motor 46 drives the first mounting rack 44, the first infrared thru-beam sensor 43 and the second infrared thru-beam sensor 49 to rotate, and finally, the first infrared thru-beam sensor 43 and the second infrared thru-beam sensor 49 are axially parallel to the valve hole. Then, the third servo motor 35 and the fourth servo motor 41 control the first infrared thru-beam sensor 43 and the second infrared thru-beam sensor 49 to radiate the valve hole, the sensors transmit the obtained signals to a signal processor, and the signal processor finally calculates the precise thickness of the valve hole. So far, the thickness detection of the valve hole is completed.

The invention claimed is:

1. A device for monitoring the thickness of a wheel valve hole on line, comprising a frame, a base plate, a lifting cylinder, a first bracket, a bearing base, a linear bearing, a mounting plate, a guide shaft, a lifting shaft, a first servo motor, a first synchronous pulley, a connecting plate, a synchronous belt, a second synchronous pulley, a base, a first connecting shaft, a second servo motor, a first shaft sleeve, a lower end cover, a second connecting shaft, a second shaft sleeve, a cylinder, a first bearing, an end cover, a gland, second bearings, a base plate, a flange plate, pins, springs, expansion flaps, a third connecting shaft, a guard, an expansion core, a third servo motor, a first lead screw, a first linear guide rail, a sliding rack, a second linear guide rail, a second lead screw, a fourth servo motor, a second bracket, an first infrared thru-beam sensor, a first mounting rack, a turnover block, a fifth servo motor, a third lead screw, a turnover seat, an second infrared thru-beam sensor, a second mounting rack, a third bracket and a visual sensor, wherein the base plate, the third bracket and the second mounting rack are fixed on the frame, the visual sensor is mounted on the third bracket, the mounting plate is fixed on the base plate via the first bracket, the bearing base is fixed on the mounting plate, the lifting shaft is mounted on the bearing base via the linear bearing, the two ends of the lifting shaft are respectively connected with the connecting plate and an output shaft of the lifting cylinder, the first servo motor and the base are fixed on the connecting plate, the first shaft sleeve is mounted on the base via the first bearing and the end cover, the first synchronous pulley and the second synchronous pulley are respectively connected with the first connecting shaft and an output shaft of the first servo motor, and the synchronous belt is connected with the first synchronous pulley and the second synchronous pulley respectively; the lower end cover, the gland and the base plate are fixed on the first shaft sleeve, the second servo motor is mounted on the lower end cover the second shaft sleeve is mounted on the first shaft sleeve via two columns of second bearings and the gland, the cylinder is fixed inside the second shaft sleeve, an output end of the cylinder is connected with the second connecting shaft, the second servo motor is connected with the second shaft sleeve via the second connecting shaft, the expansion core is connected with the second shaft sleeve via the third connecting shaft, the expansion core, the third connecting shaft and the second shaft sleeve are circumferentially locked without relative rotation, the third connecting shaft and the second shaft sleeve can move axially relatively, the flange plate is fixed on the base plate, eight uniform T-shaped chutes are formed in the inner cavity of the flange plate and the base plate, the bottom surfaces of the eight expansion flaps respectively form T-shaped structures with the eight T-shaped chutes in one-to-one correspondence, the expansion flaps can smoothly and accurately slide in the chutes, the inner side walls of the expansion flaps are 15° inclined surfaces, and the ends of the eight springs are respectively connected with the flange plate and the eight expansion flaps; the lateral surface of the expansion core comprises two groups of inclined surfaces uniformly spaced 15°, the number of each group of inclined surfaces is 8, the two inclined surfaces have a height difference, and the upper side walls of the two groups of inclined surfaces are intersected at tapered surfaces; when the expansion core is at the bottom under the co-action of the pulling force of the cylinder and the elastic force of the springs, the side walls of the expansion flaps are in contact with the tapered surfaces of the expansion core; the second servo motor drives the expansion core to rotate 22.5° via the second connecting shaft, the second shaft sleeve and the third connecting shaft, and the expansion flaps matched with the inclined surfaces can be switched between the inclined surfaces of the expansion core; the cylinder drives the third connecting shaft and the expansion core to move up and down, the eight expansion flaps move synchronously centripetally and centrifugally in the eight uniform T-shaped chutes formed in the inner cavity of the flange plate and the base plate via the fit of the expansion flaps and the inclined surfaces of the expansion core, and the eight expansion flaps realize high-precision synchronous expansion and contraction functions; since the two groups of inclined surfaces spaced uniformly on the lateral surfaces of the expansion core have a height difference, when the second servo motor drives the expansion core to rotate 22.5°, the expansion flaps matched with the inclined surfaces are switched between the inclined surfaces of the expansion core, thus, the expansion and contraction diameters of the expansion flaps change in two different ranges, and eventually the expansion flaps achieve large-stroke expansion and contraction; the third servo motor and the first linear guide rail are fixed on the second mounting rack, the first lead screw is connected with the sliding rack and the third servo motor, and the third servo motor can drive the sliding rack to move up and down along the first linear guide rail via the first lead screw; the second linear guide rail and the fourth servo motor are fixed on the sliding rack, the second lead screw is connected with the second bracket and the fourth servo motor, and the fourth servo motor can drive the second bracket to move left and right along the second linear guide rail via the second lead screw; the fifth servo motor and the turnover seat are fixed on the second bracket, the fifth servo motor is connected with the third lead screw, the first mounting rack is fixed on the turnover block, the first infrared thru-beam sensor and the second infrared thru-beam sensor are fixed on the first mounting rack, the fifth servo motor is connected with the third lead screw, an empty slot is formed in the middle of the bottom surface of the turnover seat, the third lead screw passes through the empty slot, symmetrical T-shaped ring slots are formed in the two inner sides of the turnover seat, two symmetrical T-shaped ring columns are arranged on the lower end face of the turnover block, and the T-shaped ring columns can be inserted into the T-shaped ring slots; ring teeth are arranged in the middle of the lower end face of the turnover block and engaged with the third lead screw; the fifth servo motor drives the third lead screw to rotate; through the cooperation of the ring teeth and the third lead screw, the turnover block drives the first infrared thru-beam sensor and the second infrared thru-beam sensor to turn over along the center of the T-shaped ring slots in the turnover seat.

2. The device for monitoring the thickness of a wheel valve hole on line according to claim 1, characterized in that corresponding pin holes are formed in the base plate and the flange plate, and the locating pins are respectively connected with the pin holes of the base plate and the flange plate to ensure the assembly precision of the base plate and the flange plate.

\* \* \* \* \*